US011483318B2

(12) United States Patent
Trim et al.

(10) Patent No.: US 11,483,318 B2
(45) Date of Patent: Oct. 25, 2022

(54) PROVIDING NETWORK SECURITY THROUGH AUTONOMOUS SIMULATED ENVIRONMENTS

(71) Applicant: International Business Machines Corporation, Armonk, NY (US)

(72) Inventors: Craig M. Trim, Ventura, CA (US); Joseph B. Ries, Bellevue, IA (US); Adam Lee Griffin, Dubuque, IA (US); Jennifer L. Szkatulski, Rochester, MI (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 16/736,039

(22) Filed: Jan. 7, 2020

(65) Prior Publication Data
US 2021/0211438 A1    Jul. 8, 2021

(51) Int. Cl.
*H04L 9/40*        (2022.01)
*G06N 20/00*     (2019.01)

(52) U.S. Cl.
CPC ......... *H04L 63/1416* (2013.01); *G06N 20/00* (2019.01); *H04L 63/145* (2013.01); *H04L 63/1425* (2013.01); *H04L 63/20* (2013.01)

(58) Field of Classification Search
None
See application file for complete search history.

(56) References Cited

U.S. PATENT DOCUMENTS

| 7,412,723 | B2 * | 8/2008 | Blake ................. H04L 63/0227 709/224 |
| 7,748,040 | B2 | 6/2010 | Adelstein et al. |
| 8,095,973 | B2 | 1/2012 | Kim et al. |
| 10,298,598 | B1 * | 5/2019 | McClintock ........ H04L 63/1483 |
| 11,328,067 | B2 * | 5/2022 | Pfleger de Aguiar ...................... G06F 21/566 |

(Continued)

FOREIGN PATENT DOCUMENTS

| KR | 100877664 B1 | 12/2008 | |
| WO | WO-2018038718 A1 * | 3/2018 | ............. G05B 19/05 |

*Primary Examiner* — Joseph P Hirl
*Assistant Examiner* — Hassan Saadoun
(74) *Attorney, Agent, or Firm* — Jeffrey S. LaBaw; David H. Judson

(57) ABSTRACT

A method to secure a production environment in a network begins by associating a set of resources into a simulated environment layer configured to simulate at least a portion of the production environment. A preferred approach to building the simulated environment layer utilizes generative adversarial network (GAN) machine learning modeling. Upon detecting a suspect user attempting to interact with the production environment, one or more requests received from the suspect user are routed to the simulated environment layer as opposed to the production environment. At least one behavior of the simulated environment layer is then modified as the suspect user interacts within the simulated environment layer. The modified behavior facilitates that an attack initiated by the suspect user can proceed. Information (such as the user's tactics, techniques and procedures (TPPs), or other Indicators of Compromise (IoCs) associated with the attack is captured for analysis and subsequent action.

21 Claims, 8 Drawing Sheets

(56) References Cited

U.S. PATENT DOCUMENTS

| | | |
|---|---|---|
| 2007/0250920 A1 | 10/2007 | Lindsay |
| 2008/0016339 A1 | 1/2008 | Shukla |
| 2011/0039237 A1 | 2/2011 | Skare |
| 2015/0326592 A1* | 11/2015 | Vissamsetty ........ H04L 63/1491 726/24 |
| 2017/0134423 A1* | 5/2017 | Sysman ................ G06F 21/554 |
| 2019/0245832 A1* | 8/2019 | Liu ..................... H04L 63/0428 |
| 2021/0160281 A1* | 5/2021 | Hallaji ................. H04L 63/083 |

* cited by examiner

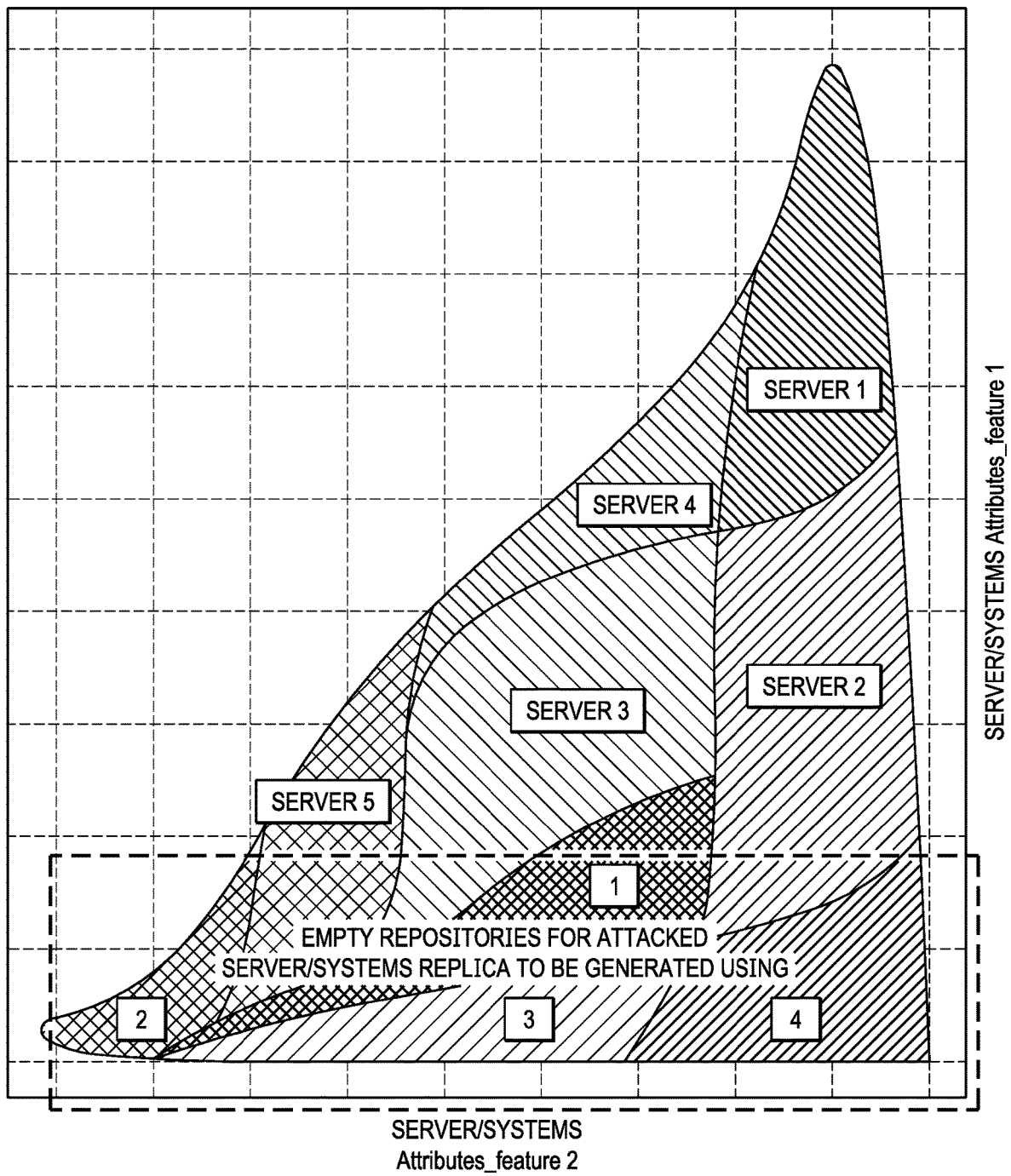

TAKE INPUT OF SERVER ATTACKED S_A WITH IMAGE OF SERVER FILES F[],
APPLICATIONS A[], #USERS U WORKING ON SAID SERVERS U[] AND THEIR DATA D[]

GENERATE RANDOM NOISE AS AN INPUT TO INITIALIZE THE GENERATOR
GENERATE FAKE DOC AND FILE IMAGES FROM NOISED INPUT
GET A RANDOM SET OF SERVER IMAGES
CONSTRUCT DIFFERENT BATCHES OF REAL AND FAKE DATA
X = np.concatenate([image_batch, generated_images])

TRICKING THE NOISED INPUT OF THE GENERATOR AS REAL DATA
NOISE = np.random.normal(0,1, [batch_size, 100])
y_gen = np.ones(batch_size)

FIG. 9

PROVIDING NETWORK SECURITY THROUGH AUTONOMOUS SIMULATED ENVIRONMENTS

BACKGROUND

Technical Field

This disclosure relates generally to cyber security for enterprise and system networks.

Background of the Related Art

Today, cyber attackers are breaching corporate networks using a myriad of techniques such as social engineering or water holing. More disturbing is that these attacks can go unnoticed for hundreds of days. These attacks not only enable the exfiltration of important confidential company data, but they also erode client trust. As a consequence, companies can no longer solely rely on perimeter-based defenses—such as intrusion detection systems (IDS) and firewalls—to protect their IT environments. More generally, traditional network traffic monitoring and misuse detection is unable to keep up with evolving attackers, sustains high error rates, and is akin to searching for a needle in an extremely large haystack. As a result, security researchers and companies alike must look inward to gain better visibility at every stage of the cyberattack lifecycle.

Adversaries typically perform initial reconnaissance missions before commencing actual attacks. Unfortunately, today's computer systems (e.g., networks, servers, services, APIs) are too honest and forthcoming in sharing tremendous amounts of information with attackers. Hence, with minimal effort, attackers can glean extremely valuable information on network topologies, currently running applications and their version and patch level, as well as potential vulnerabilities, all without the defender's knowledge. This information asymmetry favors attackers, allowing them to find a single weakness, while defenders are faced with the difficult task of keeping up.

As cyberattacks become more sophisticated there is an increasing need for better ways to detect and stop attackers. Cyber deception has garnered attention by both attackers and defenders as a weapon in the cyber battlefield. The notion of cyber counter-deception refers to the use of planned deceptions to defend information systems against attacker deceptions. Although such second-order deceptions remain largely underutilized in cyber-defensive scenarios, however, they are frequently used by attackers to search for evidence of honeypots, avoid malware analysis, and conceal their presence and identity on exploited systems. In the virtualization domain, malware attacks often employ stealthy techniques to detect virtual machine environments within which they behave innocuously and opaquely while being analyzed by antivirus tools.

When a bad actor targets a device or network, a common approach to trap the bad actor into divulging valuable tactics, techniques, and procedures (TTPs) involves setting up a honeypot or sandbox network. As typically configured, honeypots and sandboxes are forged to entice attackers into attacking a false network. More formally, and in computer terminology, a honeypot is a computer security mechanism set to detect, deflect, or, in some manner, counteract attempts at unauthorized use of information systems. Generally, a honeypot comprises data (for example, in a network site) that appears to be a legitimate part of the site but that in reality is isolated and monitored; the data is made to appear to contain information or a resource of perceived value to attackers, who (once identified) are then blocked. In this scenario, a suspect typically is classified based on their deployment (use/action) and based on their level of involvement.

Based on deployment, honeypots typically are classified as either production honeypots or research honeypots. Production honeypots typically are easy to use, but capture only limited information; often, they are set up and used by enterprises. Typically, a production honeypot is placed by an organization inside a corporate production network along with other production servers to improve the enterprise's overall security state. Normally, production honeypots are low-interaction honeypots and thus are easier to deploy. As such, they also provide less information about the attacks or attackers than research honeypots. Research honeypots are run to gather information about the motives and tactics of malicious users (e.g. the black hat community) who target different networks. These honeypots typically do not add direct value to a specific organization; instead they are used to research the threats that many organizations face, and to provide information that enable learning about how to better protect against those threats. Research honeypots are complex to deploy and maintain, and they typically capture extensive information; they are primarily used by research, military, or government organizations.

In computer security, a sandbox is a security mechanism for separating running programs, usually to mitigate system failures or to prevent software vulnerabilities from spreading. A sandbox also may be used to execute untested or untrusted programs or code, possible from unverified or untrusted third parties, suppliers, users or websites, with the goal of avoiding harm to an associated host machine or operating system. Typically, a sandbox provides a tightly-controlled set of resources, such as scratch space on disk and memory, in which guest programs run. Certain functions, such as network access, the ability to inspect the host system or to read from input devices, are usually disallowed or heavily restricted.

These known technologies are useful for their intended purposes, but they are passive in the sense that they do not force traffic into them. Indeed, honeypots are dependent on enticing bad actors into a pre-staged network that is implemented to learn about the bad actor, and to enable the actor to engage with them dynamically from a safe, protected network space. These approaches lack the ability to keep an attacker, who is attacking a production network, suitably engaged so as to enable capture of valuable forensics (e.g., TTPS, IoCs, and the like).

The technique herein addresses this need in the art.

BRIEF SUMMARY

A method to secure a production environment in a network begins by associating a set of resources into a simulated environment layer configured to simulate at least a portion of the production environment. A preferred approach to building the simulated environment layer utilizes generative adversarial network (GAN) machine learning modeling. Upon detecting a suspect user attempting to interact with the production environment, one or more requests received from the suspect user are routed to the simulated environment layer as opposed to the production environment. At least one behavior of the simulated environment layer is then modified as the suspect user interacts within the simulated environment layer. The modified behavior facilitates that an attack initiated by the suspect user can proceed. Information (such as the user's tactics, techniques and procedures (TPPs), or other Indicators of Compromise (IoCs) associated with the attack is captured for analysis and subsequent action.

The technique herein provides for enhanced security through the creation and use of an autonomous simulated environment that is configured to mirror a true production environment, and that is then continuously modified (e.g., through various attack iterations) while useful information about the attacker is collected. In this approach, upon a determination that an entity is or may be malicious, the attacker is directed into the simulated reality environment (sometimes referred to as a layer). As the attack continues (e.g., through multiple iterations), the simulated reality layer itself is varied (e.g., in configuration, operation, or the like) so as to present a continually-varying attack surface. In this manner, the simulated reality layer is exposed to the actor but with the attacked environment (that is being simulated) is configured to modify its behavior in a direction of its choosing under specified rules or configurations, or via machine learning. By exposing the simulated reality layer (in which the actor continues to operate), various indicia about the attack and the attacker (e.g., tactics, techniques and procedures (TTPs) and Indicators of Compromise (IoCs)) are captured for analysis.

Generalizing, a system that implements this approach detects an attack on the production network and reroutes it from the production environment to a simulated environment for data capturing and analysis. Meanwhile, the dynamically-mapped production network (as represented by the simulated reality layer) is moved to a new area within the network, with the new area serving (from the attacker's perspective) as its new production environment. Preferably, the simulated reality layer (or, more generally, the security protection layer) is varied upon each iteration (from one attack to another) even as the actor remains persistent. In this manner, the IT infrastructure being presented to the attacker is continuously changing, analogous to the way in which "worlds" are procedurally-generated in a gaming solution. In effect, and using continuing with the analogy, the technique of this disclosure forces the attacker into continuously-varied/changing production-like environments all while the system tracks the attack(s) and attacker through those varied simulated environments.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 8 depicts a Whitaker diagram that visualizes server and application entity resources within a representative production environment;

FIG. 9 depicts a training flow for a generative adversarial network (GAN) machine learning model that is used to build a simulated environment according to an embodiment of this disclosure.

DETAILED DESCRIPTION OF AN ILLUSTRATIVE EMBODIMENT

As background, the following describes representative computing machines and systems, and computer networks that may be used to support Information Technology (IT) infrastructures in which the techniques of this disclosure may be implemented. For further context, several execution environments (FIGS. 3-5) and network-based security technologies are also described.

Figure 1:
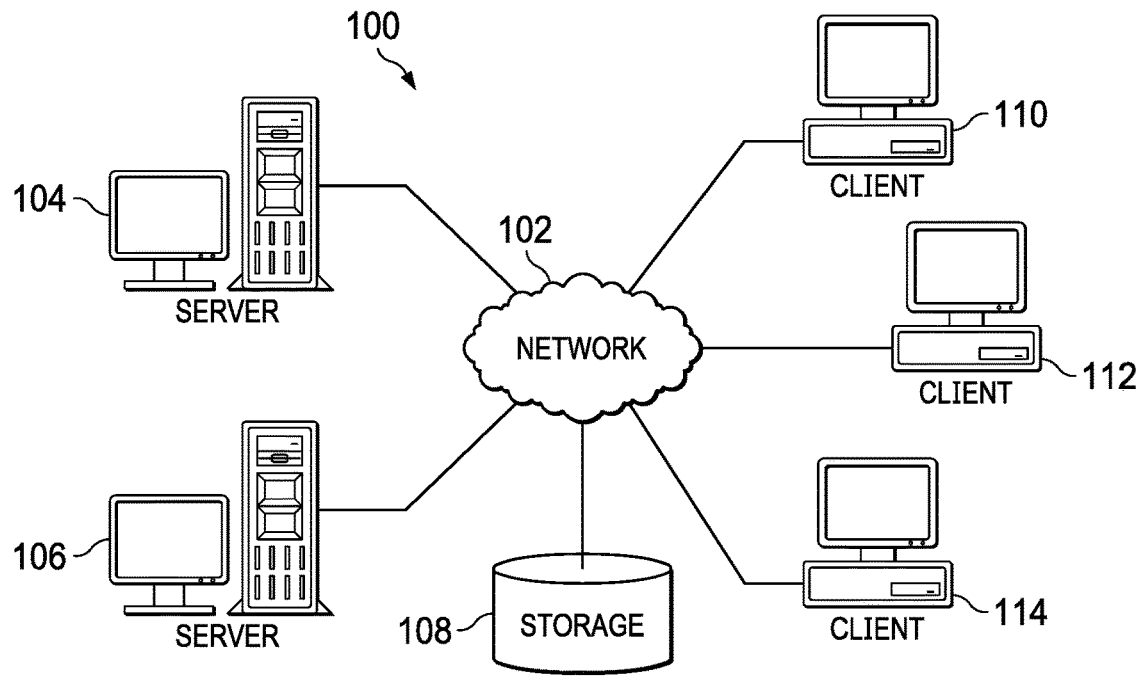
FIG. 1 depicts an exemplary block diagram of a distributed data processing environment in which exemplary aspects of the illustrative embodiments may be implemented.
Figure 2:
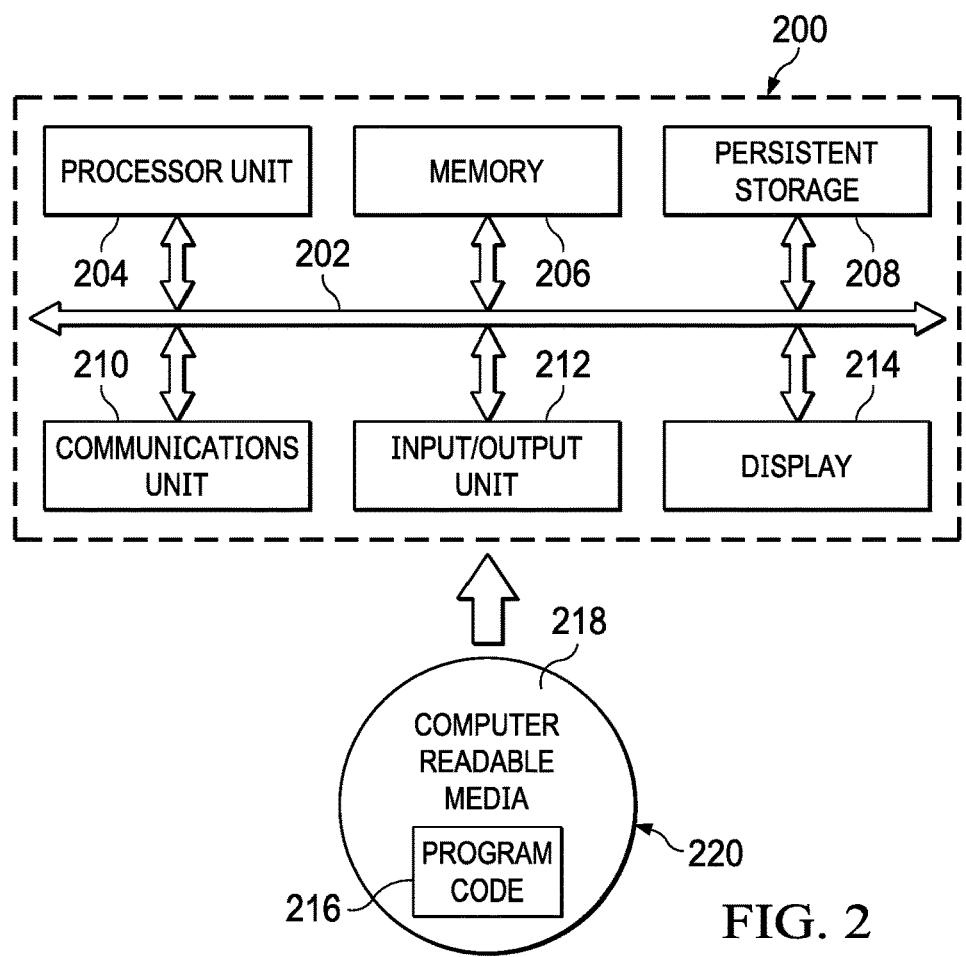
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to one or more clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Computing machines such as described above may provide for machine learning. As is well-known, machine learning involves using analytic models and algorithms that iteratively learn from data, thus allowing computers to find insights in the data without being explicitly programmed where to look. Machine learning may be supervised or unsupervised. Supervised machine learning involves using training examples by which the machine can learn how to perform a given task. Unsupervised machine learning, in contrast, involves providing unlabeled data objects, which the machine then processes to determine an organization of the data. One well-known type of unsupervised machine learning is clustering, which refers to the notion of assigning a set of observations into subsets, which are referred to as "clusters," such that observations within a cluster have a degree of similarity. A common approach to clustering is k-means clustering, which is an algorithm that classifies or groups objects based on attributes or features into k number of group, typically by minimizing a sum of squares of distances between data and a centroid of a corresponding cluster. Unsupervised machine learning via clustering provides a way to classify the data. Other clustering algorithms are well-known.

A generative adversarial network (GAN) is a type of machine learning wherein two neural networks contest with each other in a game. Given a training set, this technique learns to generate new data with the same statistics as the training set. The neural networks consist of a generative network (or "generator"), which generates candidates, and a discriminative network (or "discriminator"), which evaluates them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network. In operation, a known dataset serves as an initial training data for the discriminator. Training the generator involves presenting it with samples from the training dataset, until it achieves acceptable accuracy. The generator trains based on whether it succeeds in fooling the discriminator. Typically, the generator is seeded with randomized input that is sampled from a predefined latent space (e.g. a multivariate normal distribution). Thereafter, candidates synthesized by the generator are evaluated by the discriminator. Backpropagation is applied in both networks. Typically, the generator is implemented as a de-convolutional neural network, and the discriminator is implemented as a convolutional neural network.

Security Intelligence Platform with Incident Forensics

Figure 3:
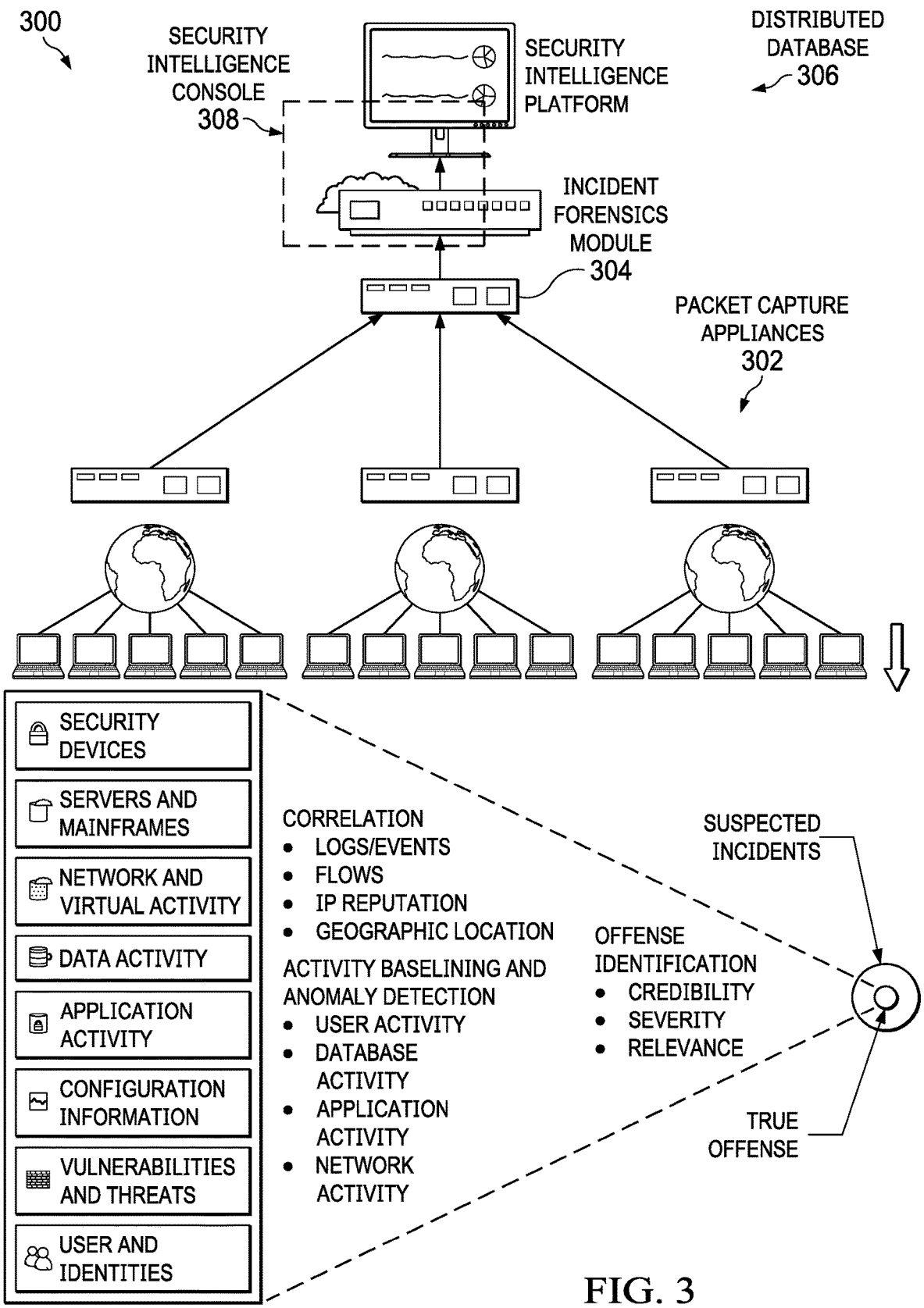
FIG. 3 illustrates a security intelligence platform in which the techniques of this disclosure may be practiced.

A representative security intelligence platform in which the techniques of this disclosure may be practiced is illustrated in FIG. 3.

Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
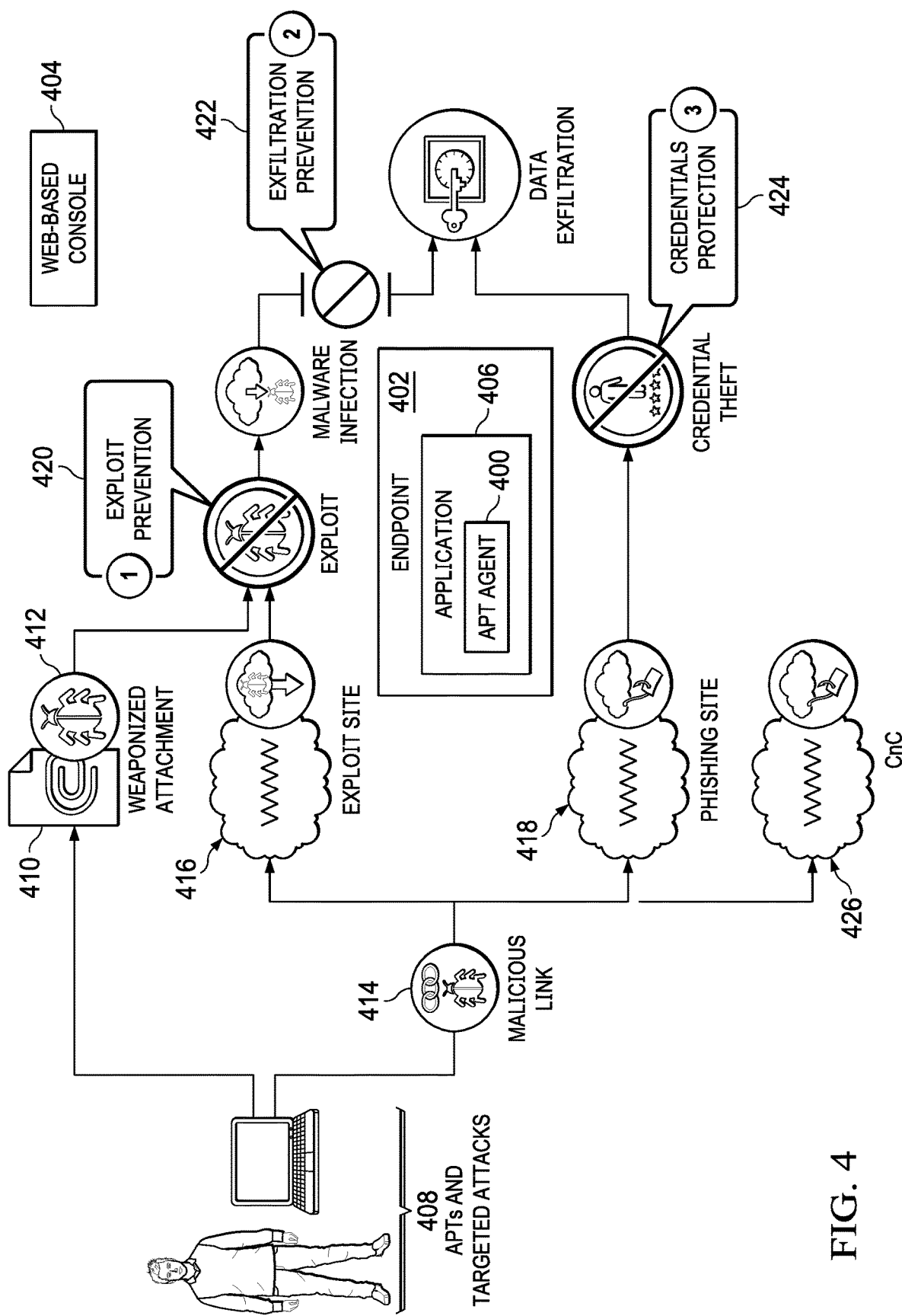
FIG. 4 depicts an Advanced Persistent Threat (APT) platform in which the techniques of this disclosure may be practiced.

An appliance of this type can facilitate Security Information Event Management (STEM). For example, and as noted above, IBM® Security QRadar® STEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Cognitive Cybersecurity Analytics

Figure 5:
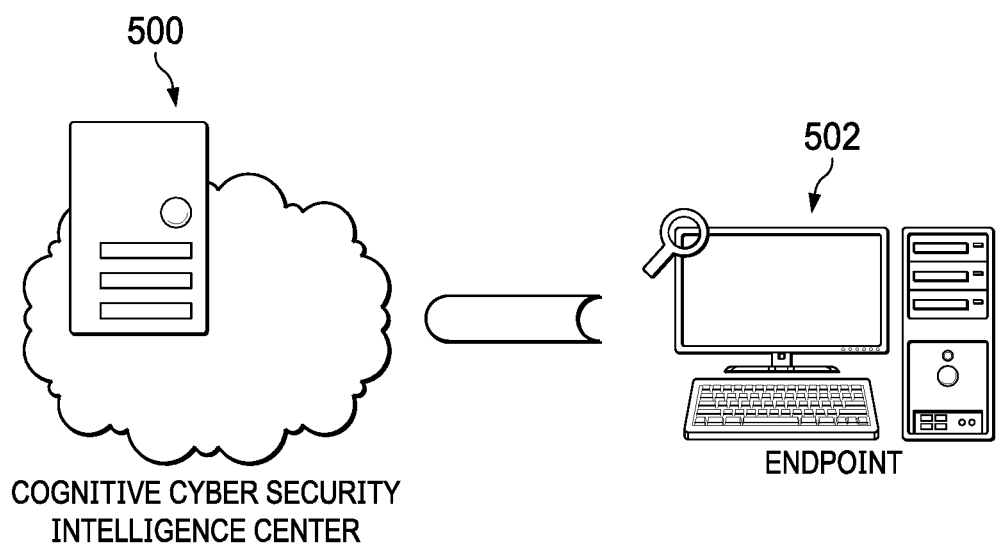
FIG. 5 illustrates an operating environment in which a cognitive cybersecurity intelligence center is used to manage an endpoint machine and in which the techniques of this disclosure may be implemented.

FIG. 5 depicts a basic operating environment that includes a cognitive cybersecurity intelligence center 500, and an endpoint 502. An endpoint 502 is a networked device that runs systems management code (software) that enables management and monitoring of the endpoint by the intelligence center 500.

The endpoint typically is a data processing system, such as described above in FIG. 2. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques of this disclosure, or such techniques may be implemented in a product or system dedicated for this purpose.

In a typical implementation, an endpoint is a physical or virtual machine or device running an operating system such as Windows, Mac OSX, Vmware ESX, Linux, Unix, as various mobile operating systems such as Windows Phone, Symbian, iOS and Android. The cybersecurity intelligence center typically operates as a network-accessible security management platform comprising a plurality of machines and application software. Typically, the intelligence center supports cybersecurity analytics, e.g., using machine learning and the like. The intelligence center may operate in a dedicated manner to support a plurality of endpoints, or "as-a-service" on behalf of multiple enterprises each having their own endpoints. Typically, endpoint machines communicate with the intelligence center in a client-server paradigm, such as depicted in FIG. 1 and described above. The intelligence center may be located and accessed in a cloud-based operating environment.

In this approach, events, such as inter-process, events are sent from endpoints, such as endpoint 502, to a detection server executing in the intelligence center 500, where such events are analyzed. Preferably, attack detection occurs in the detection server. This approach provides for an efficient, systematic (as opposed to merely ad hoc) mechanism to record endpoint activities, e.g., via inter-process events, to describe a malicious or suspicious behavior of interest with abstractions (network graphs), and to match concrete activities (as represented in the recorded events) with abstract patterns. This matching enables the system to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

Providing Security Through Autonomous Simulated Environments

Figure 6:
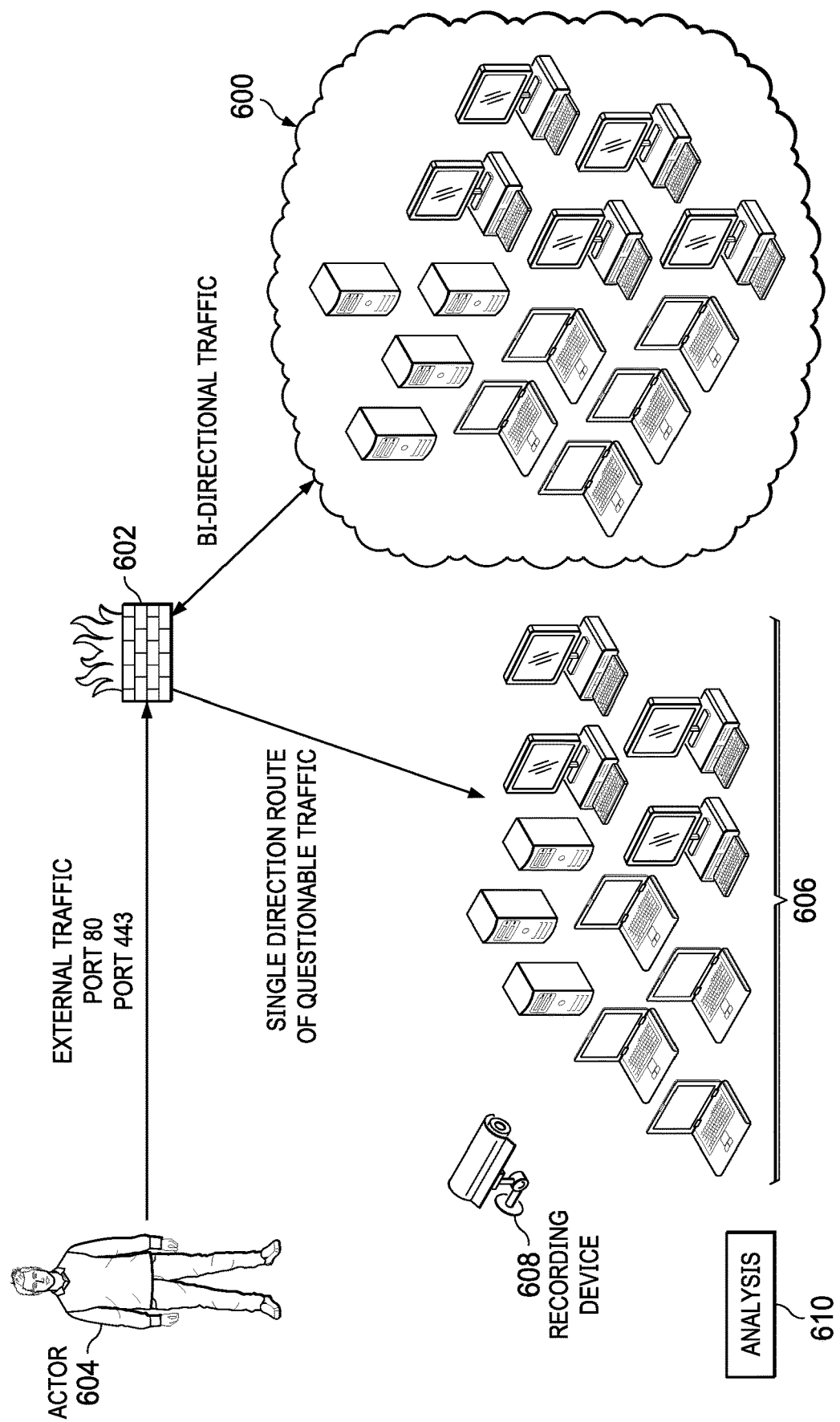
FIG. 6 depicts a representative production environment and an associated simulated environment into which an actor is routed according to the technique of this disclosure.

With the above as background, the technique of this disclosure is now described. The high level operational flow is shown in FIG. 6. As depicted, an enterprise production environment 600 is configured and protected from external threats by enterprise firewall 602. At step (1), an actor 604 makes a request to access the corporate network infrastructure in that production environment 600. The firewall 602 determines how to route the traffic, e.g., by analyzing request header information associated with the request. Other techniques may be used by the firewall 602 for this purpose. If, based on the analysis the traffic appears to be legitimate traffic, the request is then routed to the production environment 600 for normal handling. If, however, the request is determined to be suspicious (or otherwise potentially-suspect), according to this disclosure the request instead is then routed to an alternative production-like environment 606. This alternative environment is sometimes referred to herein as an autonomous simulated environment, or a simulated reality layer, or a simulated production environment. As will be described in more detail below, the environment 606 typically is configured in whole or in part in advance of receipt of the request. In the latter case, in effect a copy of the attacked environment is mirrored in this simulated environment 606, and the actor's interactions thereafter occur in the simulated environment. Nevertheless, and from the actor's perspective, the actor's traffic appears to function as if it is in the true production environment 600, all while being monitored/recorded by recording device 608, and evaluated (e.g., for new IoCs, attack vectors, TPPs, and the like) by analysis device 610. According to an aspect of this disclosure, and as will be described, once the actor is routed into it, the simulated environment 606 is not static but constantly changes/evolves.

Figure 7:
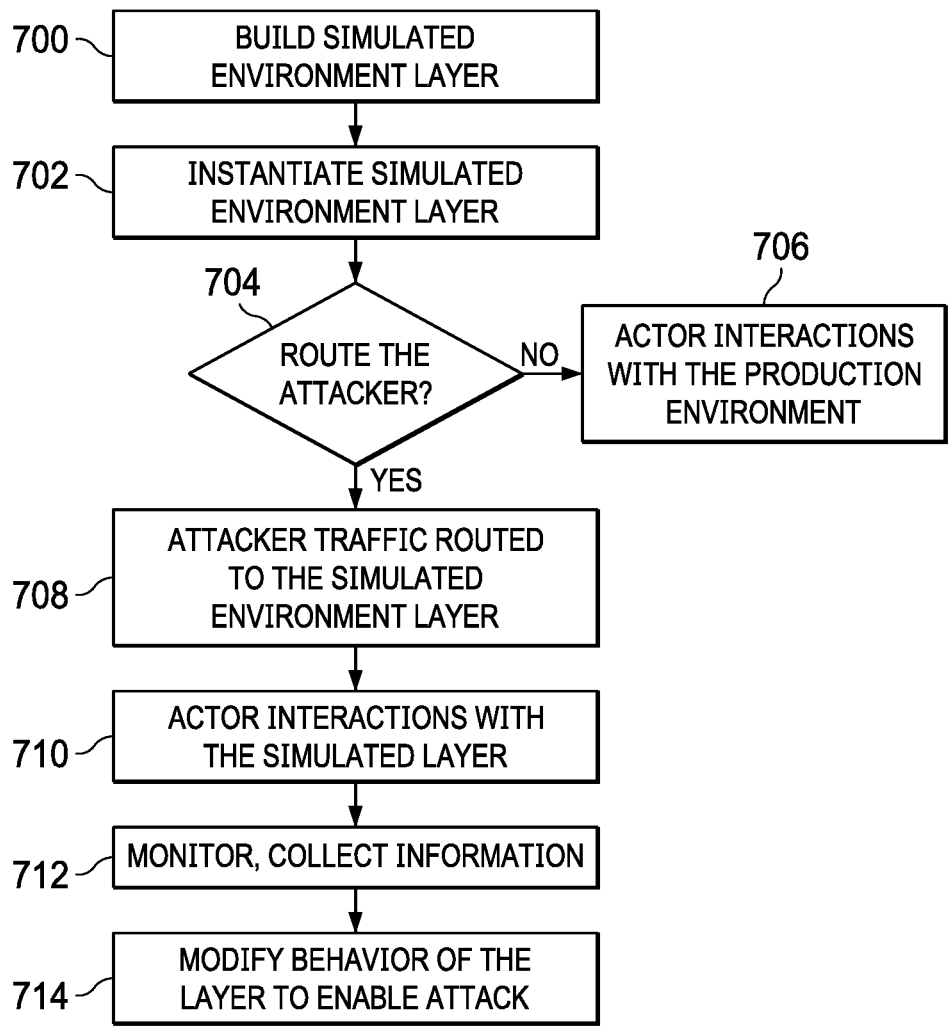
FIG. 7 depicts a high level process flow of an approach of this disclosure.

FIG. 7 is a high level process flow of the technique of this disclosure. This flow begins at step 700 with the building of the autonomous simulated environment. Various building approaches are described below, with a preferred approach involving using generative adversarial network (GAN) machine learning. At step 702, the simulated environment is instantiated. As noted above, the layer may be instantiated on-the-fly (upon a given occurrence), or in advance. Depending on implementation, the simulated environment may be implemented in its own physical and/or virtualized network, although more commonly the environment is configured within some then unused segment or portion of an existing network. Thus, e.g., the simulated environment may comprise a set of servers, applications, or other resources that are not then active or used in the production environment itself. The simulated environment may also be implemented using external or third party resources, perhaps (as noted above) "as-a-service," although typically the environment remains within the confines of the enterprise itself (such as depicted in FIG. 6). At step 704, a test is made to determine whether an actor should be routed into the simulated environment layer. Step 704 also may occur before step 702 (e.g., if the determination forms a basis for instantiating the layer). Because the actor typically is located externally to the production network, typically the notion of routing the actor refers to routing requests received from the actor, as well as the associated responses that are made in response to those requests. Of course, the nature of the requests and the associated responses are varied and typically depend on the nature, scope and target of the attack itself (the attack vector). If not, and as indicated at 706, the actor remains in the production environment. If, however, a determination is made that the actor is suspicious, the process continues at step 708 with the actor (namely, his or her traffic and associated responses) being rerouted over to the simulated environment. Thereafter, and as indicated generally at 710, the actor is interacting within that environment as opposed to the production environment. As will be described, such interactions may involve providing the actor with responses (to various actions) that are dynamically varied so as to "fool" the actor into believing that he or she is operating within a true (active) production environment. During the actor's interactions, various TTPs, IoCs and other useful information are collected. This is step 712. At step 714, the simulated environment is modified, adjusted or otherwise evolved as needed to maintain the realism necessary to keep the actor engaged in his or her interaction(s) in the environment.

One approach to building the autonomous simulated environment is now described. In this embodiment, the creation of the simulated environments begins with a set of instructions or initial settings list that provide a description of the actual production environment. Using this initial settings list, continuous configuration automation tooling is used to manufacture the environment dynamically, perhaps even as the actor traverses the environment. In this embodiment, and if the same actor is expected to return to the environment (multiple iterations), the initial starting point may be created to be the same, but with variations then applied so that the dynamic configuration of the environment would not necessarily be the same for each iteration.

To provide a more concrete example, assume that there are a number of known attack scenarios and metrics, e.g., those obtained using binary classification machine learning and Markov decision tree techniques to ascertain variations and fluctuations from normal activity. Attack scenarios are ingested, and newly-tagged attacks (if detected) are flagged and fed into the proposed system for future application. Attack scenarios come from real-world exposure as well as supervised machine learning (ML) red-team exercises. In addition, and assuming that the attacker is present, anomalous activity is automatically triggered as a potential attack and is transferred to the newly-simulated environment for further analytical review and processing. In this example, attack scenario behaviors are compared with the behavior of an actor on the network. Using linear regression and supervised ML, for example, the system determines whether an attack is occurring. Using a clustering algorithm such as K Nearest Neighbor (KNN), the system ascertains the structure of the existing computing production environment and, as necessary, copies this environment to a segmented part of the network that serves as the simulated environment. Thus, and depending on implementation, the simulated network may comprise a special segment of the production network, a separate dedicated network, or other network resources (segments, sub-segments and physical or virtualized resources).

Continuing with the example scenario, KNN is used to determine structure of computing environment, e.g., based on characteristics and behaviors displayed by various devices in a particular network segment of interest. For example, assume K=square root of n. where n=a number of characteristics defined by a data set, if K=even, K=K+1. In this example, let the network segment in question be defined as the computing environment for an enterprise finance department and that is determined first assembling the characteristics of devices used for financial data processing (e.g., characteristic 1: financial application data exchange occurs over port 3439; characteristic 2: applications x, y, and z are used for the financial analysts; characteristic 3: financial zone devices have the same identifying marker within their MAC addresses; and characteristic 4: devices within the finance department communicate directly with an identified finance node and database). In this example, K=3. When a new node is added to the network, and using Euclidean distance for determination, and based on its nearest characteristic neighbors, the new node is classified and designated as to its related computing purpose. In this manner, and given this example scenario, the structure of the relevant computing environment is determined and can then be reconstituted to exist within the simulated environment. A similar process is carried out and maintained with each defined segment within the trained model. Based on the different structure, function and operations associated with each network segment, computing characteristics of one team (e.g., HR) typically are defined differently from some other team (e.g., the Finance team) and thus their nearest neighbors are determined as such using the supervised model.

Once it is determined that the actor has launched an attack, e.g., the attacker is seeking to attack the victim over port 80, the simulated environment preferably dynamically adjusts its activity, e.g., based on the nature of the attack. In this example, and because the attacker is launching activity over port 80, the system enables port 80 for receiving attacker traffic. As another example, if the detected attack vector involves the actor searching the SQL server, the system dynamically generates a SQL server with dummy data. These attack vectors and the system-generated responses are merely exemplary.

Generalizing, upon detection of the bad actor, the actor is routed to a newly-instantiated simulated environment, and (as the above examples describe) that environment is dynamically changed or varied based on the actor's actions or anticipated actions, and possibly other factors or training. In this example scenario, and as described above, the actor's activities within the simulated environment are recorded. Based on learned TTPs, IoCs and the like, the actor also be formally classified as either bad or benign actor. To this end, e.g., a binary classification algorithm, based on supervised training (e.g., an ML system using red teaming efforts) or unsupervised training (e.g., network activity) may be used. Anomalous behavior also may be sent to a quality control or testing environment for further action, or for other learning. In this approach, data preprocessing may be used to perform feature normalization and extraction to determine the nature of attack and its respective implications prior to applying KNN and taking the ameliorative action(s) of dynamically varying the environment and/or the responses provided to the actor. Because the actor has been shunted over to the simulated environment, it is not required to take ameliorative actions (e.g., blocking the user, sandboxing the user, etc.) within the real production network; instead, the bad actor can be permitted to roam about within the simulated environment as additional useful information is gleaned.

There are still other approaches that may be implemented to provide for generation (and as needed modification) of the simulated environment, as is now described. More generally, this process is sometimes referred to herein as procedural generation.

In particular, another embodiment is to provide for a simulated replica (of the production environment) that is generated based on historical or other data. In this embodiment, and using ingested and known attack scenarios, the system performs a prescriptive analysis to determine what needs, assets, and qualifications an attacker requires to carry out a prospective attack. Information of this type may be obtained from various attack detection mechanisms/firewall systems, such as IPS/IDS, network anomaly detection, SIEM rule identification, or other application layer identification mechanisms. This information provides a way to determine the existence of an attack scenario with the given context of the production network and application layer-based activity within that network. Generalizing, to proactively detect the attacker's efforts, common scenarios are ingested by the system to determine common attacker techniques, tactics and procedures. Using this information, the system generates a replica of the production environment and instantiates it as the simulated environment(s) into which the actor is then routed. Thus, a replica is generated with a bias toward providing the attacker with a simulated environment that is desirable for the attacker's anticipated needs. The information used to generate the replica may also be used to determine a prediction of the attack scenario, and to provide a simulated environment most beneficial for the needs of the monitoring and analysis system. In this embodiment, generation of the replica is based both on known environment variables, known attacker needs, and potentially some degree of randomization, as noted with the goal of providing simulated environment sufficient for attacker data capture and subsequent knowledge analysis.

In the above-described approach, and as the attacker interacts with the replica, a prediction analysis (designed to predict the attacker's next step) is performed. The prediction analysis is predicated on the ingestion of the attacker's techniques, tactics and procedures (TTPs), as ingested by the system during the monitoring and recording of the actor's actions once routed to interact with the replica. This information may be augmented with other open source data and textual information, e.g., about common attack scenarios. Using this information, the predication analysis applies appropriate learning (e.g., clustering algorithms) to determine likely next steps the attacker will take. If necessary, the system then adjusts the replica to enable the attacker can then attempt and potentially fulfill his or her next step.

While the above approach is useful, a still preferred approach to procedural generation is now described. In this embodiment, a GAN-based model (using generative and discriminative network training) is used to generate and adjust as needed the simulated environment (the replica) that is contextually similar to the production environment. By way of background, it is assumed that various metrics about the production environment are available. Thus, for example, assume that there are multiple servers/systems that are available in the actual production environment (and that are prone to attack). Information about those servers/systems are stored with various server metadata, such as the server files associated therewith, computation speed, applications being used, the number of users working on the servers/systems, the nature and type of active or passive operations being performed on the servers/systems, and so forth. In addition to this type of data, real-time data, such as a user's operations at a particular time, may be captured. The user in this context may be the actor/attacker, who may be permitted to interact within the actual production environment to enable capture and recording of such information. In this context, preferably a caching system is employed to record and remember a given number of last steps in the system, which steps are then adapted to be replayed as necessary to retrace the attacker's movements, operations and interactions. In addition, the system also has available to it information such as described above (e.g., from existing security data sources) that defines common attack scenarios within the given context of the production network and application layer-based activity within that network. This information provides for common attacker techniques, tactics, and procedures.

FIG. 8 depicts a Whitaker diagram for visualization the servers/systems and their attributes. This depiction is two-dimensional (2D) for simplicity but typically is multi-dimensional depending on the feature set comprising the set of metrics available to the procedural generation function. Thus, in FIG. 8, the y axis corresponds to a clustering of servers and their attributes associated with a first feature set, while the x axis corresponds to the servers and their attributes associated with a second feature set. As depicted, and in this example production environment, there are five (5) servers (S1-S5) that are deemed to be prone to the potential attack. In addition, the diagram depicts four empty spaces (repositories), boxes [1-4] that in this example serve to model the simulated environment. Each of the boxes thus acts as space for a simulated server S'. The GAN comprises the discriminator D and the generator G, and the above-described attributes and clusters of server application entities are used to train these networks in order to generate the simulated environment.

Because it may take time to generate the simulated server layer, preferably the GAN modeling (the procedural generation function) obtains information from the caching system that has been employed to record and replay the last (x) steps in the system in order to replay them from memory, where "x" is calculated by the system needs and tasking at the calculated moment. As soon as the attacker location (e.g., one of servers S1-S5) at a particular time is detected, the line representing that attack vector in the Whitaker diagram is intercepted to route the attacker to one of the empty spaces [boxes 1-4]. The discriminator network creates additional users and fake simulated replicas operating on a simulated server S' (newly created space from one of the selected boxes), e.g., based on a proximal distance of the system interconnection [box 1-4] with the attacked server (S1-S5). When training the discriminator, the generator values are held constant, and vice versa, and preferably each network is trained against a static adversary. This affords the generator a better read on the gradient to which it must learn. Preferably, the discriminator is pre-trained, e.g., against server attributes and metrics before the generator is trained, although this is not a requirement. During training, the discriminator ingests both real and simulated server attributes in alternate locations and returns probabilities, namely, a number between "0" and "1," with "1" representing a prediction of authenticity and "0" representing otherwise. FIG. 9 depicts representative training operations for the GAN machine learning in this embodiment.

Thus, and according to this embodiment, generative adversarial network (GAN) modeling is used to generate the simulated environment layer simulating the production network (or portion thereof). As described above, preferably a prediction analysis is then applied to determine likely next steps the attacker will take (in the replica environment). The simulated environment layer is then modified (evolved) as necessary, e.g., to enable the attacker to take a next-predicted step. Moreover, preferably the simulated environment provides dynamically-varying responses to the user as he or she interacts with the simulated environment, with the goal of fooling the attacker into believing that he or she is operating within the real production environment.

The system and method described herein leverages techniques associated with "open-world gameplay" and simulated reality to provide an environment wherein a bad actor is presented with tantalizing data to proceed with attacks, preferably in a simulated production environment layer. By providing a "simulated reality" layer to a bad actor, the attacked environment also is able to modify its behavior in the direction of its choosing, e.g., by allowing the attacker to proceed as if his or her actions are succeeding. In this way, the simulated reality allows the bad actor to continue his or her actions in an environment that is conducive to his or her attacks, while all TTPs and Indicators of Compromise (IoCs) are captured for analysis. In the system, attacks on a production network are detected and the actor rerouted from production to simulated environment for analysis and data capturing. Meanwhile, the affected portions of the production network are simulated to serve as the actor's new production environment. This security model is based on the notion of procedural generation, which refers to the notion of content being generated algorithmically, or so-called "world-building." Preferably, the protection layer is varied upon each iteration and thus is ever-changing from one attack to another even if the bad actor remains persistent. Preferably, each engagement by the attacker with the system is unique to the scenario at hand, meaning the IT infrastructure being presented to the attacker is configured using a continuous world building strategy, thereby providing a self-generating environmental display that from the attacker's perspective is believable, even as the attacker unknowingly participates in what is in effect a gameplay scenario.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

The system, and in particular the modeling and simulation components, typically are each implemented as software, i.e., as a set of computer program instructions executed in one or more hardware processors. The components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service.

The components may implement the workflow synchronously or asynchronously, continuously and/or periodically.

The approach may be integrated with other enterprise- or network-based security methods and systems, such as in a SIEM, APT, graph-based cybersecurity analytics, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As noted, aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the GAN generation and processing techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The production environment is any executing process, program, network service, module, or other computational component or system.

The techniques herein may be practiced for other purposes, e.g., to facilitate development, debugging, testing or other operational or forensic analysis.

The information ascertained by monitoring, collecting, and analyzing an attack within the simulated environment may be used for various purposes, such as training, other machine learning, controlling attack mitigation systems, devices and operations, and so forth.

The nomenclature used herein also should not be taken to be limiting.

Having described the subject matter, what we claim is as follows.

The invention claimed is:

1. A method to secure a production environment in a network, comprising:
   associating a set of resources into a simulated environment layer configured to simulate at least a portion of the production environment;
   upon detecting a suspect user attempting to interact with the production environment, routing one or more requests received from the suspect user to the simulated environment layer as opposed to the production environment; and modifying at least one behavior of the simulated environment layer as the suspect user interacts within the simulated environment layer, the modified behavior facilitating an attack initiated by the suspect user; and capturing information associated with the attack.

2. The method as described in claim 1 further including analyzing the captured information to identify one of: a tactic, technique and procedure (TTP) of the suspect user, and an Indicator of Compromise (IoC) associated with the attack.

3. The method as described in claim 1 wherein modifying the at least one behavior includes providing dynamically-varying responses to requests received from the suspect user.

4. The method as described in claim 1 wherein the set of resources are associated into the simulated environment using generative adversarial network (GAN) machine learning.

5. The method as described in claim 1 wherein the simulated environment layer is generated from network history and is implemented as set of variations, wherein successive variations of the simulated environment layer are different.

6. The method as described in claim 5 wherein the set of variations are procedurally-generated.

7. The method as described in claim 1 further including generating a prediction of a next step in the attack, and using the prediction to modify the at least one behavior.

8. An apparatus to secure a production environment in a network, comprising:
a processor;
computer memory holding computer program instructions executed by the processor, the computer program instruction configured to:
associate a set of resources into a simulated environment layer configured to simulate at least a portion of the production environment;
upon detecting a suspect user attempting to interact with the production environment, route one or more requests received from the suspect user to the simulated environment layer as opposed to the production environment; and
modify at least one behavior of the simulated environment layer as the suspect user interacts within the simulated environment layer, the modified behavior facilitating an attack initiated by the suspect user; and
capture information associated with the attack.

9. The apparatus as described in claim 8 wherein the computer program instructions are further configured to include code configured to analyze the captured information to identify one of: a tactic, technique and procedure (TTP) of the suspect user, and an Indicator of Compromise (IoC) associated with the attack.

10. The apparatus as described in claim 8 wherein the computer program instructions configured to modify the at least one behavior include code configured to provide dynamically-varying responses to requests received from the suspect user.

11. The apparatus as described in claim 8 wherein the set of resources are associated into the simulated environment using generative adversarial network (GAN) machine learning.

12. The apparatus as described in claim 8 wherein the simulated environment layer is generated from network history and is implemented as set of variations, wherein successive variations of the simulated environment layer are different.

13. The apparatus as described in claim 12 wherein the set of variations are procedurally-generated.

14. The apparatus as described in claim 8 wherein the computer program instructions further including code configured to generate a prediction of a next step in the attack, and code configured to use the prediction to modify the at least one behavior.

15. A computer program product in a non-transitory computer readable medium, the computer program product holding computer program instructions executed by a host machine to secure a production environment in a network, the computer program instructions comprising program code configured to:
associate a set of resources into a simulated environment layer configured to simulate at least a portion of the production environment;
upon detecting a suspect user attempting to interact with the production environment, route one or more requests received from the suspect user to the simulated environment layer as opposed to the production environment; and
modify at least one behavior of the simulated environment layer as the suspect user interacts within the simulated environment layer, the modified behavior facilitating an attack initiated by the suspect user; and
capture information associated with the attack.

16. The computer program product as described in claim 15 wherein the computer program instructions are further configured to include code configured to analyze the captured information to identify one of: a tactic, technique and procedure (TTP) of the suspect user, and an Indicator of Compromise (IoC) associated with the attack.

17. The computer program product as described in claim 15 wherein the computer program instructions configured to modify the at least one behavior include code configured to provide dynamically-varying responses to requests received from the suspect user.

18. The computer program product as described in claim 15 wherein the set of resources are associated into the simulated environment using generative adversarial network (GAN) machine learning.

19. The computer program product as described in claim 15 wherein the simulated environment layer is generated from network history and is implemented as set of variations, wherein successive variations of the simulated environment layer are different.

20. The computer program product as described in claim 19 wherein the set of variations are procedurally-generated.

21. The computer program product as described in claim 15 wherein the computer program instructions further including code configured to generate a prediction of a next step in the attack, and code configured to use the prediction to modify the at least one behavior.

* * * * *